United States Patent
Zink et al.

(10) Patent No.: US 9,343,862 B2
(45) Date of Patent: May 17, 2016

(54) ELECTRICALLY CONDUCTIVE BEARING SYSTEM AND METHOD

(71) Applicant: KAMATICS CORPORATION, Bloomfield, CT (US)

(72) Inventors: Andrew Zink, Middletown, CT (US); Arkadi Zak, Longmeadow, MA (US)

(73) Assignee: KAMATICS CORPORATION, Bloomfield, CT (US)

( * ) Notice: Subject to any disclaimer, the term of this patent is extended or adjusted under 35 U.S.C. 154(b) by 26 days.

(21) Appl. No.: 14/303,035

(22) Filed: Jun. 12, 2014

(65) Prior Publication Data
US 2015/0364887 A1    Dec. 17, 2015

(51) Int. Cl.
| H01R 39/00 | (2006.01) |
| H01R 39/64 | (2006.01) |
| F16C 41/00 | (2006.01) |
| F16C 7/02 | (2006.01) |
| F16C 11/06 | (2006.01) |
| H01R 43/00 | (2006.01) |
| B64D 45/02 | (2006.01) |

(52) U.S. Cl.
CPC ............ *H01R 39/643* (2013.01); *F16C 7/02* (2013.01); *F16C 11/0685* (2013.01); *F16C 41/002* (2013.01); *H01R 43/00* (2013.01); *B64D 45/02* (2013.01); *F16C 2202/32* (2013.01); *Y10T 29/49004* (2015.01)

(58) Field of Classification Search
CPC .............................. H01R 39/643; H01R 35/04
USPC ...................................... 439/8, 17, 11, 23–28
See application file for complete search history.

(56) References Cited

U.S. PATENT DOCUMENTS

| 3,581,267 A | * | 5/1971 | Schreffler | ............... F16C 33/60 439/17 |
| 3,701,072 A | * | 10/1972 | Bjorn | ...................... F16C 33/32 439/17 |
| 4,053,665 A | | 10/1977 | Orkin et al. | |
| 4,108,505 A | | 8/1978 | Orkin | |
| 4,134,842 A | | 1/1979 | Orkin et al. | |
| 4,717,268 A | | 1/1988 | Orkin | |
| 4,978,234 A | * | 12/1990 | Ouchi | ..................... G01P 3/443 324/173 |
| 5,069,559 A | | 12/1991 | Muller et al. | |
| 5,110,221 A | | 5/1992 | Narkon et al. | |
| 5,125,845 A | * | 6/1992 | Benktander | .......... F16C 41/007 384/448 |
| 5,398,294 A | | 3/1995 | Narkon | |
| 5,516,213 A | | 5/1996 | Moriyama et al. | |
| 5,602,539 A | * | 2/1997 | Lemoine | ................. B21B 31/07 340/682 |
| 6,786,559 B1 | | 9/2004 | Kidd et al. | |
| 7,878,814 B2 | | 2/2011 | Chin et al. | |

(Continued)

FOREIGN PATENT DOCUMENTS

FR    2782758 A1    3/2000

OTHER PUBLICATIONS

Extended European Search Report and Written Opinion issued on Oct. 30, 2015 in corresponding EP Patent Application No. 15170689.2.

*Primary Examiner* — Abdullah Riyami
*Assistant Examiner* — Thang Nguyen
(74) *Attorney, Agent, or Firm* — Cantor Colburn LLP

(57) ABSTRACT

An electrically conductive bearing system including a support member having an inner surface, a bearing element provided at the inner surface of the support member, and an electrically conductive element provided in the bearing element forming an electrically conductive flow path to the support member.

21 Claims, 5 Drawing Sheets

(56) References Cited

U.S. PATENT DOCUMENTS

| | | | |
|---|---|---|---|
| 2004/0067662 A1* | 4/2004 | Tsutsumi | B25J 19/0029 439/17 |
| 2004/0114994 A1* | 6/2004 | Tsutsumi | B25J 19/0029 403/164 |
| 2005/0175266 A1 | 8/2005 | Noack et al. | |
| 2008/0053811 A1 | 3/2008 | Balsells et al. | |
| 2010/0156236 A1* | 6/2010 | Ziegert | H01R 39/643 310/238 |
| 2012/0240350 A1 | 9/2012 | Natu et al. | |

* cited by examiner

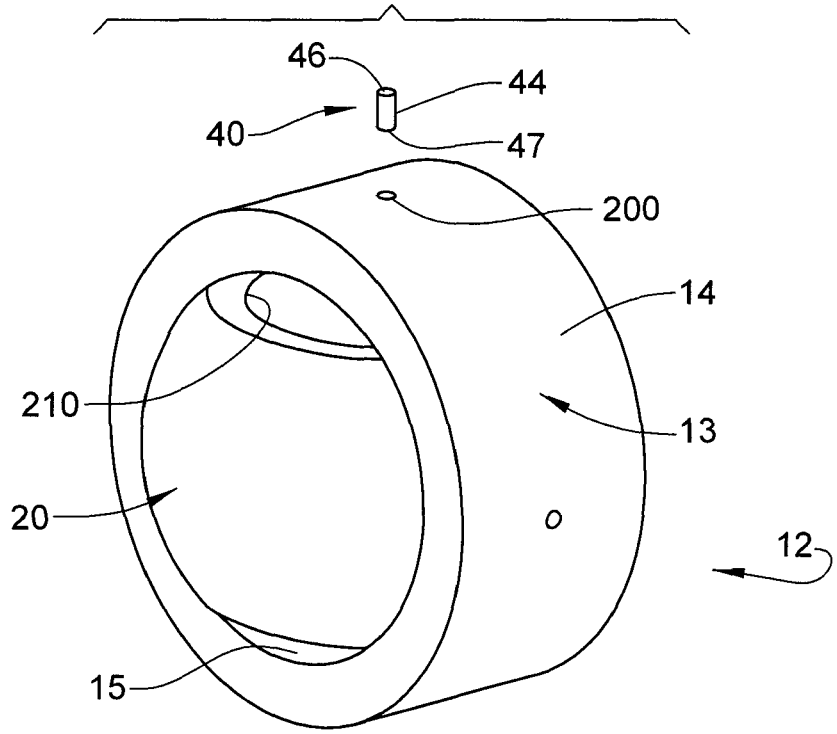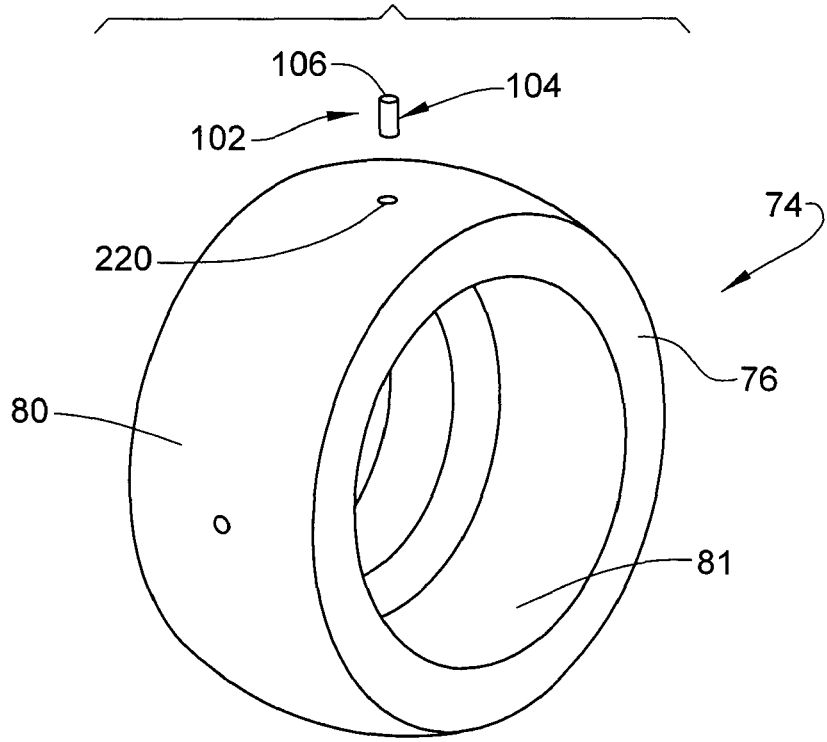

ELECTRICALLY CONDUCTIVE BEARING SYSTEM AND METHOD

BACKGROUND OF THE INVENTION

Exemplary embodiments pertain to the art of bearing systems and, more particularly, to an electrically conductive bearing system and method.

Many existing bearing systems include inner and outer components provided with a low friction material or coating. In many cases, the coating acts as an insulator that inhibits a flow of electrical current. However, in many applications, such as in aerospace manufacturing, it is desirable to maintain electrically conductive paths through a structure. In such applications, electrically insulated bearings, including self-lubricating bearings, create manufacturing constraints and require additional strapping or the like to maintain an electrically conductive flow path. The addition of strapping or "bridges" adds weight to the structure.

In some cases, manufacturers may employ an electrically conductive lubricant, or grease, to maintain an electrically conductive flow path across bearing components. However, overtime the electrically conductive grease may migrate from the bearing creating an opening in the electrically conductive flow path. Additionally, grease and other lubricants may attract dust and other contaminants that can adversely affect an overall service life of many types of bearing systems. In other cases, manufacturers may employ an electrically conductive bearing shield, or utilize ribs on one or more of the races. The electrically conductive bearing shield increases an overall weight of the bearing assembly and forming ribs on one or more of the races increases an overall component cost of the bearing assembly.

BRIEF DESCRIPTION OF THE INVENTION

Disclosed is an electrically conductive bearing system including a support member having an inner surface, a bearing element provided at the inner surface of the support member, and an electrically conductive element provided in the bearing element forming an electrically conductive flow path to the support member.

Also disclosed is a method of forming an electrically conductive bearing including inserting an electrically conductive element into a bearing element of a bearing system, and mounting the bearing element to a support member, the electrically conductive element forming an electrically conductive flow path between the bearing element and the support member.

BRIEF DESCRIPTION OF THE DRAWINGS

The following descriptions should not be considered limiting in any way. With reference to the accompanying drawings, like elements are numbered alike:

FIG. 5 depicts the bearing element of FIG. 1 receiving an electrically conductive element, in accordance with an aspect of an exemplary embodiment; and FIG. 6 depicts the bearing element of FIG. 3 receiving an electrically conductive element, in accordance with another aspect of an exemplary embodiment.

DETAILED DESCRIPTION OF THE INVENTION

A detailed description of one or more embodiments of the disclosed apparatus and method are presented herein by way of exemplification and not limitation with reference to the Figures.

Figure 1:
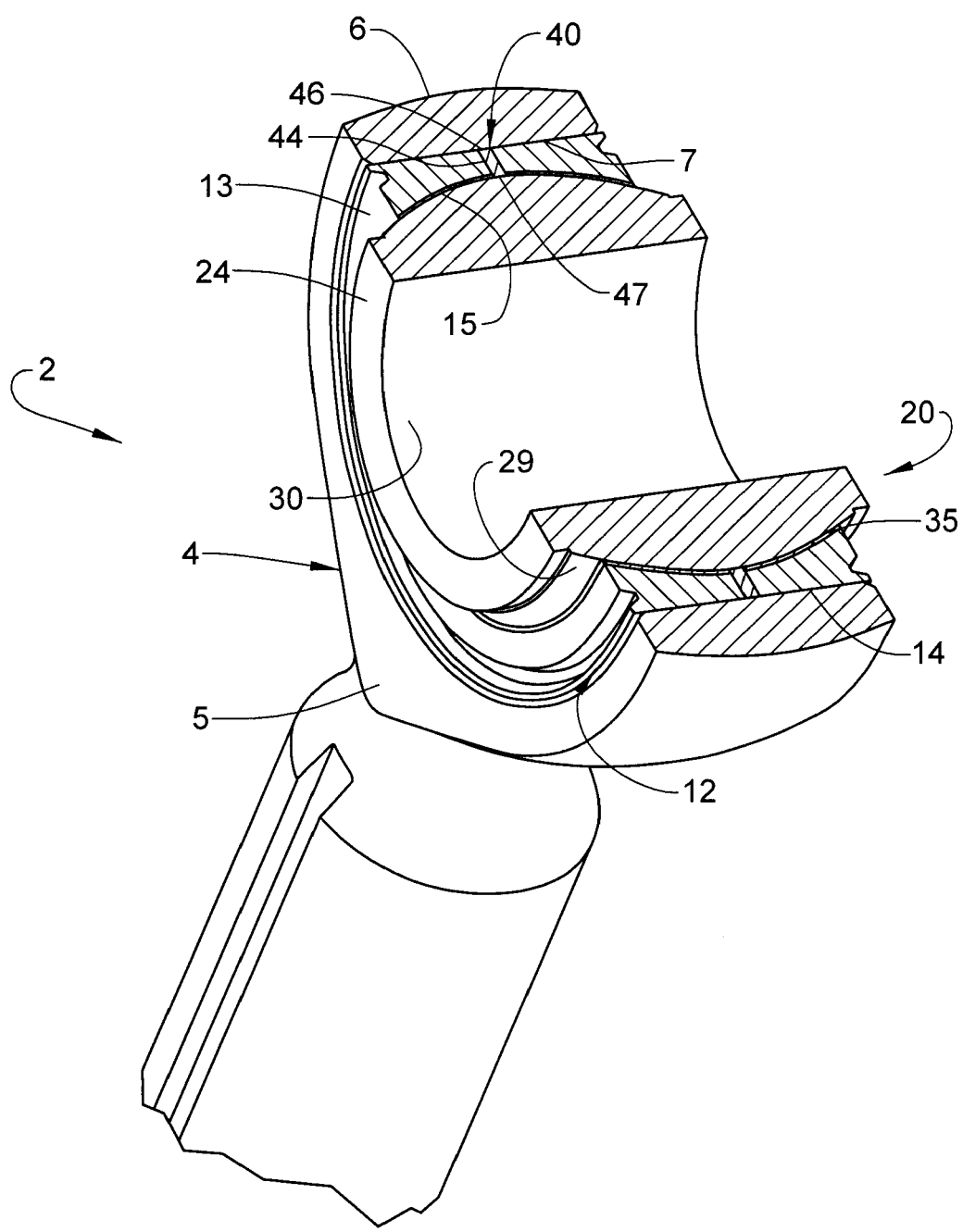
FIG. 1 depicts a cross-sectional view of an electrically conductive bearing system including a bearing element mounted to a support member and supporting a component, in accordance with an aspect of an exemplary embodiment.
Figure 2:
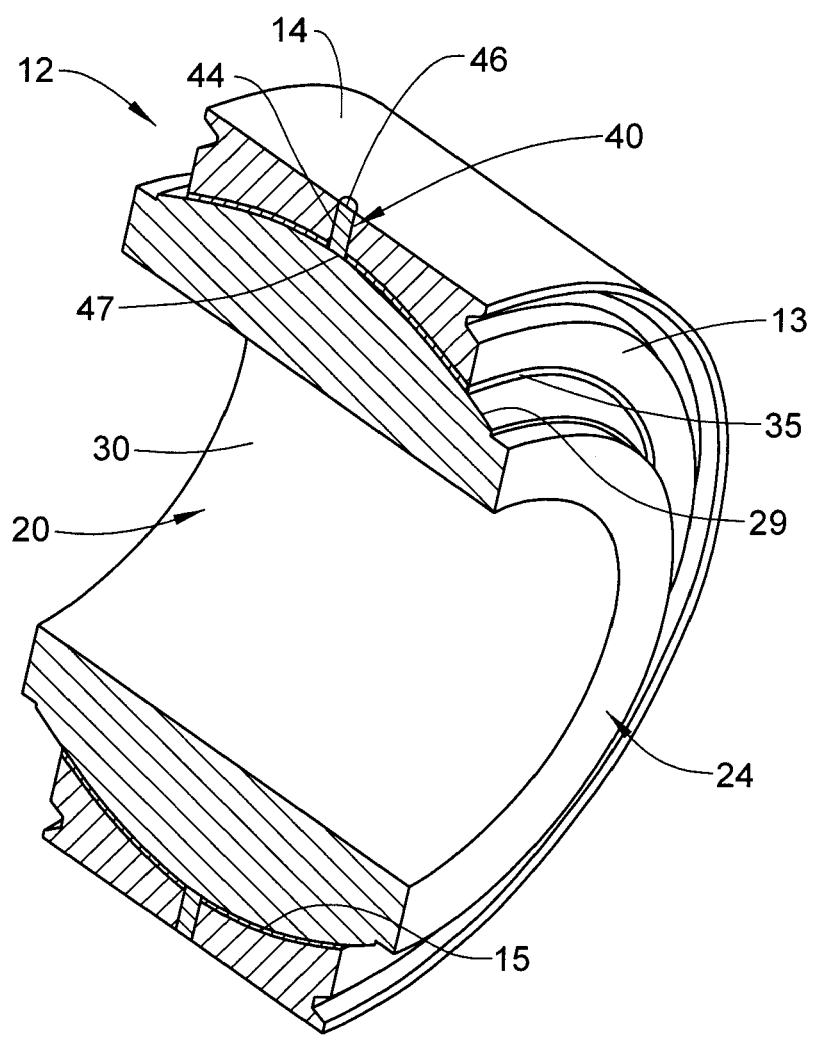
FIG. 2 depicts a cross-sectional view of the bearing element and component of FIG. 1.

An electrically conductive bearing system, in accordance with an exemplary embodiment, is indicated generally at 2, in FIGS. 1-2. Bearing system 2 includes a support member 4 shown in the form of a rod end 5. Rod end 5 includes an outer surface 6 and a generally cylindrical inner surface 7. A bearing element 12, shown in the form of a liner 13, is arranged at inner surface 7. Liner 13 includes an outer surface portion 14 and an inner surface portion 15. A bearing component 20 is arranged at inner surface portion 15. Bearing component 20, shown in the form of a shouldered ball 24, includes an outer surface section 29 and an inner surface section 30. A self-lubricating liner 35 is arranged between outer surface section 29 and inner surface portion 15. Self-lubricating liner 35 may take the form of a non-electrically conductive material that forms a low friction layer. Self-lubricating liner 35 may be a separate component bonded to one of outer surface section 29 and inner surface portion 15. Self-lubricating liner 35 could also take the form of a coating chemically bonded to one of outer surface section 29 and inner surface portion 15.

In accordance with an exemplary embodiment, electrically conductive bearing system 2 includes an electrically conductive element 40 that provides an electrically conductive bridge between rod end 5 and bearing component 20. Electrically conductive member 40 takes the form of a pin 44 extending from a first end 46 to a second end 47 through bearing element 12. First end 46 is exposed at outer surface portion 14 and second end 47 is exposed at inner surface portion 15. First end 46 is in electrically conductive contact with inner surface 7 of rod end 5 and second end 47 is in electrically conductive contact with outer surface section 29 of shouldered ball 24.

In accordance with an aspect of an exemplary embodiment, pin 44 is formed from an electrically conductive ductile material. Specifically, pin 44 is formed from a material having a hardness that is less than a hardness of rod end 5 and less than a hardness of bearing component 20. In accordance with an aspect of an exemplary embodiment, pin 44 may be formed from a material including copper. In this manner, rotation of bearing element 12 relative to rod end 5 and/or rotation of bearing element 12 relative to bearing component 20 may cause a deformation of one, the other, or both of first and second ends 46 and 47 to ensure an electrically conductive contact with the corresponding ones of inner surface 7 and outer surface section 29.

Figure 3:
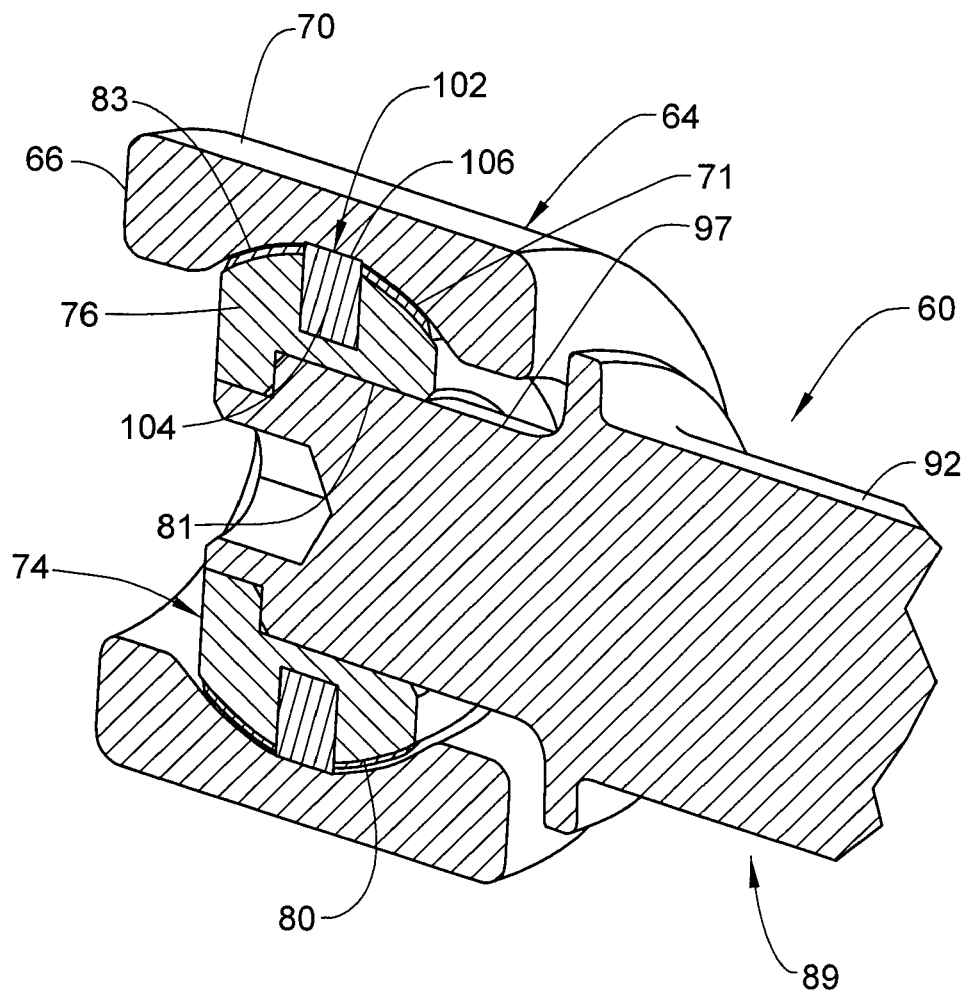
FIG. 3 depicts a cross-sectional view of an electrically conductive bearing system, in accordance with another aspect of an exemplary embodiment.

Reference will now follow to FIG. 3 in describing an electrically conductive bearing system 60, in accordance with another aspect of an exemplary embodiment. Electrically conductive bearing system 60 includes a support member 64 shown in the form of an outer bearing race 66. Bearing race 66 includes an outer surface 70 and a generally spherical inner surface 71. A bearing element 74, shown in the form of a split ball 76, is arranged at inner surface 71. Split ball 76 is formed from an electrically conductive material and includes an outer surface portion 80 and an inner surface portion 81. Generally, a self-lubricating liner 83 is arranged between inner surface 71 and outer surface portion 80. Self-lubricating liner 83 may take the form of a non-electrically conductive material that forms a low friction layer. Self-lubricating liner 83 may be a separate component bonded to one of inner surface 71 and outer surface portion 80. Self-lubricating liner 83 could also take the form of a coating chemically bonded to one of inner surface 71 and outer surface portion 80. Bearing component 89, shown in the form of a track roller 92, includes an outer surface section 97.

In accordance with an exemplary embodiment, electrically conductive bearing system 60 includes an electrically conductive element 102 that provides an electrically conductive bridge between split ball 76 and bearing race 66. Electrically conductive member 102 takes the form of a pin 104 provided in split ball 76. Electrically conductive element 102 includes an end 106 exposed at outer surface portion 80. End 106 is in electrically conductive contact with inner surface 71 of bearing race 66.

In accordance with an aspect of an exemplary embodiment, pin 104 is formed from an electrically conductive ductile material. Specifically, pin 104 is formed from a material that may have a hardness that is less than a hardness of bearing race 66. Of course, it should be understood that in certain applications pin 104 may be formed from a material having a hardness that may be equal to, or even exceed that of, bearing race 66. In accordance with an aspect of an exemplary embodiment, pin 104 may be formed from a range of materials including copper and bronze. In this manner, rotation of split ball 76 relative to bearing race 66 may cause a deformation of end 106 to ensure an electrically conductive contact with inner surface 71.

Figure 4:
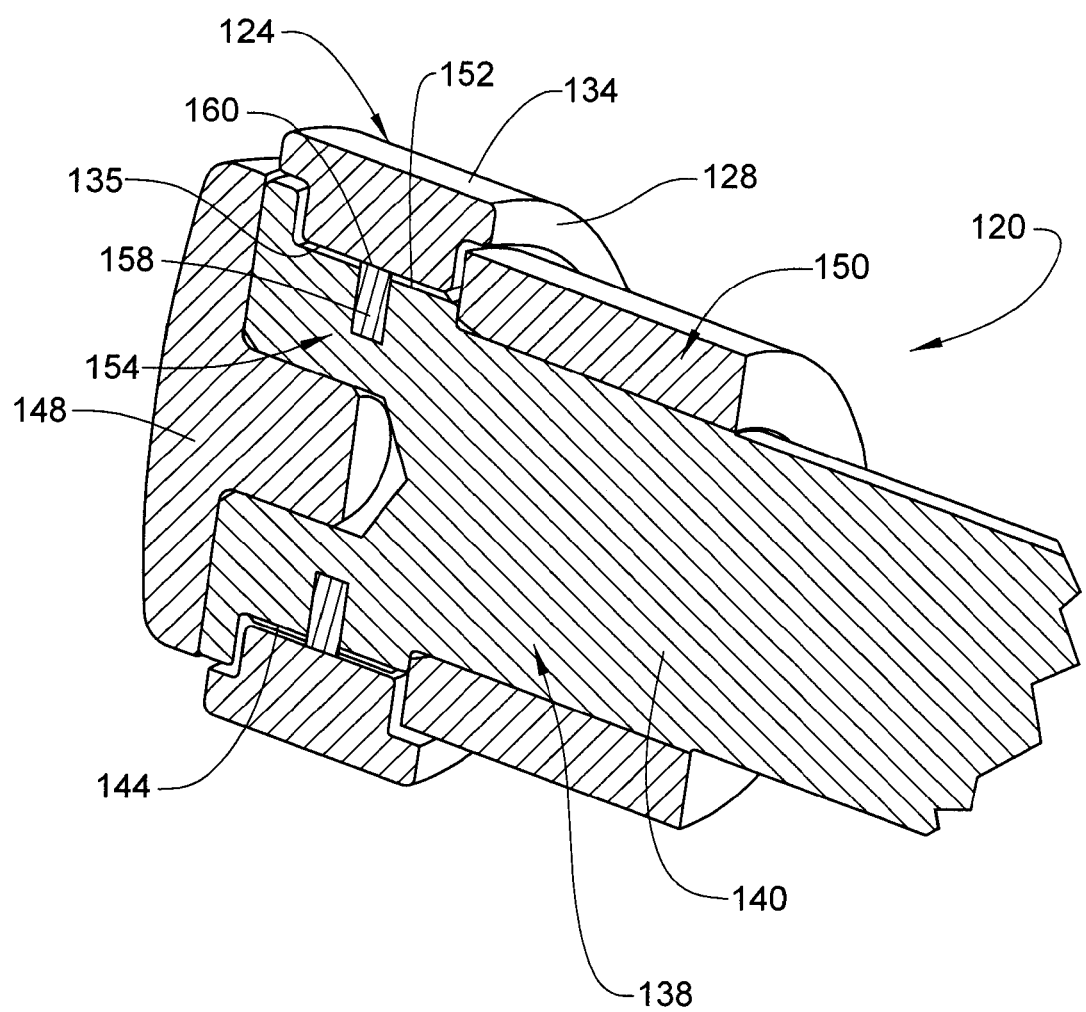
FIG. 4 depicts a cross-sectional view of an electrically conductive bearing system, in accordance with yet another aspect of an exemplary embodiment.

Reference will now follow to FIG. 4 in describing an electrically conductive bearing system 120 in accordance with yet another aspect of an exemplary embodiment. Electrically conductive bearing system 120 includes a support member 124 shown in the form of an outer bearing race 128. Bearing race 128 includes an outer surface 134 and a generally cylindrical inner surface 135. A bearing element 138, shown in the form of a track roller 140, is arranged at inner surface 135. Track roller 140 is formed from an electrically conductive material and includes an outer surface portion 144 and an end cap 148. Track roller 140 may also include a sleeve 150 that provides an interface to a support structure (not shown). Generally, a self-lubricating liner 152 is arranged between inner surface 135 and outer surface portion 144. Self-lubricating liner 152 may take the form of a non-electrically conductive material that forms a low friction layer. Self-lubricating liner 152 may be a separate component bonded to one of inner surface 135 and outer surface portion 144. Self-lubricating liner 152 could also take the form of a coating chemically bonded to one of inner surface 135 and outer surface portion 144.

In accordance with an exemplary embodiment, electrically conductive bearing system 120 includes an electrically conductive element 154 that provides an electrically conductive bridge between track roller 140 and bearing race 128. Electrically conductive element 154 takes the form of a pin 158 provided in track roller 140. Electrically conductive element 154 includes an end 160 exposed at outer surface portion 144. End 160 is in electrically conductive contact with inner surface 135 of bearing race 128.

In accordance with an aspect of an exemplary embodiment, pin 158 is formed from an electrically conductive ductile material. Specifically, pin 158 is formed from a material that may have a hardness that is less than a hardness of bearing race 128. Of course, it should be understood that in certain applications pin 158 may be formed from a material having a hardness that may be equal to, or even exceed that of, bearing race 128. In accordance with an aspect of an exemplary embodiment, pin 158 may be formed from a range of materials including copper and bronze. In this manner, rotation of track roller 140 relative to bearing race 128 may cause a deformation of end 160 to ensure an electrically conductive contact with inner surface 135.

In accordance with an aspect of an exemplary embodiment illustrated in FIG. 5, electrically conductive element 40 may be mounted in bearing element 12 by first rotating bearing component 20. A passage 200 is formed through bearing element 12 opposite an opening 210 of bearing component 20. After forming passage 200, electrically conductive element 40 may be inserted and secured in place. Additional passages (not separately labeled) may also be formed and provided with corresponding electrically conductive members. In accordance with an aspect of an exemplary embodiment, after insertion, first end 46 of electrically conductive element 40 may be machined to form a surface that corresponds to a surface contour of liner 13. In FIG. 6, an opening 220 is formed in outer surface portion 80 of bearing element 74. Opening 220 may not extend through inner surface portion 81. Once formed, electrically conductive element 102 may be inserted and secured in place. Additional electrically conductive elements (not separately labeled) may also be installed into bearing element 74. In a manner similar to that described above, after insertion, end 106 of electrically conductive element 102, may be machined to form a surface that corresponds to a surface contour of outer surface portion 80.

At this point, it should be understood, that the exemplary embodiments describe an electrically conductive bearing having an electrically conductive element that may be provided in a rotating portion of a bearing assembly. The electrically conductive element is exposed at surfaces of the rotating component and is designed to deform when contacted by an opposing surface. In this manner, the electrically conductive element maintains an electrically conductive bridge between components of a bearing system.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electrically conductive bearing system comprising:
   a support member having an inner surface;
   a bearing element provided at the inner surface of the support member; and
   an electrically conductive element extending through the bearing element forming an electrical connection between the bearing element and the support member.

2. The electrically conductive bearing system according to claim 1, further comprising: a bearing component arranged within the bearing element, the electrically conductive element electrically connecting the bearing component and the support member through the bearing element.

3. The electrically conductive bearing system according to claim 2, wherein the bearing component comprises a ball.

4. The electrically conductive bearing system according to claim 3, wherein the ball comprises a shouldered ball.

5. The electrically conductive bearing system according to claim 2, wherein the bearing component comprises a track roller.

6. The electrically conductive bearing system according to claim 1, wherein the bearing element includes an outer surface portion, the electrically conductive element being exposed at the outer surface portion.

7. The electrically conductive bearing system according to claim 1, wherein the bearing element includes an outer surface portion and an inner surface portion, the electrically conductive element being exposed at both the outer and inner surface portions.

8. The electrically conductive bearing system according to claim 1, wherein the electrically conductive element comprises a material having a hardness that is less than a hardness of the support member.

9. The electrically conductive bearing system according to claim 1, wherein the electrically conductive element comprises an electrically conductive pin arranged in the bearing element.

10. The electrically conductive bearing system according to claim 1, wherein the electrically conductive element passes through a non-electrically conductive self-lubricating liner arranged between the bearing element and the support member.

11. A method of forming an electrically conductive bearing comprising:
   inserting an electrically conductive element through, at least a portion of, a bearing element of a bearing system; and
   mounting the bearing element to a support member, the electrically conductive element electrically the bearing element and the support member.

12. The method of claim 11, further comprising: forming an opening in the bearing element.

13. The method of claim 12, wherein inserting the electrically conductive element into the bearing element comprises inserting an electrically conductive pin into the opening.

14. The method of claim 11, further comprising: mounting the bearing element to a bearing component.

15. The method of claim 14, further comprising: positioning the electrically conductive element to pass through a non-electrically conductive self-lubricating liner establishing an electrically conductive flow path between the bearing component and the support member.

16. The method of claim 14, wherein mounting the bearing element to the bearing component comprises supporting a ball into the bearing element.

17. The method of claim 16, wherein the electrically conductive element electrically connects the ball and the support member through the bearing element.

18. The method of claim 14, wherein mounting the bearing element to the component comprises supporting a track roller within the bearing element.

19. The method of claim 11, further comprising: exposing an end of the electrically conductive element at an outer surface portion of the bearing element.

20. The method of claim 19, further comprising: deforming the end of the electrically conductive element through an interaction with the support member.

21. The method of claim 19, further comprising: machining the end of the electrically conductive element to the same shape as the outer surface of the self-lubricating liner.

* * * * *